United States Patent [19]

Burrows

[11] 3,709,519
[45] Jan. 9, 1973

[54] PROTECTIVE WHEEL ENCLOSURE

[76] Inventor: Edwin H. Burrows, 5700 Rock Creek Road, Agoura, Calif. 91301

[22] Filed: April 8, 1971

[21] Appl. No.: 132,339

[52] U.S. Cl. ............................. 280/150 R, 150/52 K
[51] Int. Cl. .............................................. B60r 27/00
[58] Field of Search ....... 150/54 B, 54 A, 52 K, 52 R; 301/37 R; 208/150 R; 206/46 T, 46 PV

[56] References Cited

UNITED STATES PATENTS 1,753,519  4/1930  Kanner .............................. 301/37 R
3,474,803  10/1969  Davis ................................. 150/52 K Primary Examiner—Benjamin Hersh
Assistant Examiner—Robert R. Song
Attorney—Roger A. Marrs

[57] ABSTRACT

A protective wheel enclosure is disclosed herein for use with a stored vehicle to prevent or restrict damage to a selected wheel set thereof. The enclosure provides a bag-like container having an open mouth for insertably receiving a selected wheel set of the vehicle so that the wheels are completely enclosed and separated from its surrounding environment. A closure device detachably couples the mouth of the container about the axle of the vehicle to seal the interior of the container. A pouch of desiccator is incorporated into the interior of the enclosure to effect removal of moisture therefrom.

4 Claims, 6 Drawing Figures

PATENTED JAN 9 1973 3,709,519
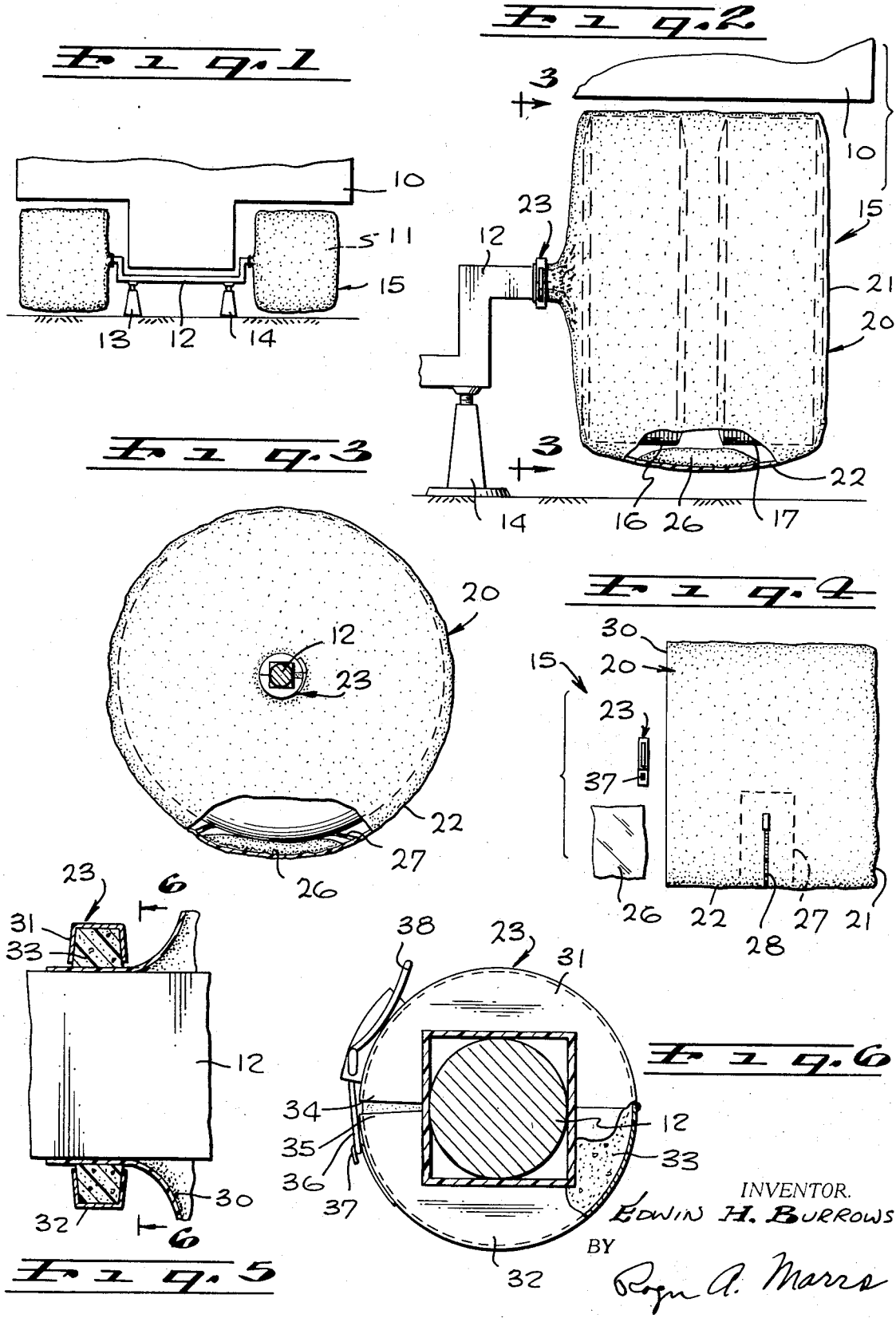
INVENTOR.
EDWIN H. BURROWS
BY
Roger A. Marrs

PROTECTIVE WHEEL ENCLOSURE

BACKGROUND OF THE INVENTION

1. Field of the Invention

This invention relates to devices for the protection of vehicle wheels and, more particularly, to a novel enclosure for detachably assembling with a wheel set so as to isolate the wheel set from a damaging or adverse environment.

2. Description of the Prior Art

In the past, it has been known to protect the spare wheel or tire of a vehicle by incorporating a removable case or enclosure which normally releasably attaches to the tire of the wheel. Such wheel covers are shown in U. S. Letters Pat. Nos. 1,311,267; 1,557,954 and 1,710,808. It is to be noted that these covers or carriers are employed to protect only the spare tire and not necessarily the wheel on which the tire is carried. This is evidenced by the fact that the protector or carrier is not intended to seal the tire from its surrounding environment and the cover or carrier is intended to merely improve the appearance or esthetics of the vehicle rather than the protection of the tire. In fact, it is to be noted that these prior art wheel carriers or covers do not fully enclose either the tire or the wheel on which the tire is carried. Therefore, an adverse environment is permitted to attack or otherwise deteriorate or fatigue the tire. Additionally, such an adverse climate or environment can adversely affect the wheel bearings, axle and the metal of the wheel itself. These prior art devices provide only a temporary protection for the tire and protection is subservient to the requirements of support for the spare tire and appearance.

Therefore, there has been a long standing need to provide a protective device for isolating tires from its surrounding environment, particularly when the vehicle is in a storage position or location. In modern times, it is a conventional practice to relocate trailers, mobile homes and the like from one place to another while residing at a given location for a prolonged period of time. Unless the tires or wheels of the vehicle are suitably protected, fatigue and other deteriorating conditions will exist. Therefore, a need has existed to provide a wheel set enclosing device which will remove or prevent the adverse environmental effects from attacking the wheel and its tire. The device is preferably removable so that it may be readily installed or disassembled when it is desired to place the vehicle in activity.

SUMMARY OF THE INVENTION

Accordingly, the above difficulties and problems are encountered with prior art wheel covers and carriers are obviated by the present invention which provides a bag-like enclosure having an open mouth adapted to insertably receive a vehicle wheel set and a portion of its axles. Means are provided for closing the open mouth of the container about its axle in releasable engagement therewith so that the interior of the container represents a controlled environment. Within this controlled environment a suitable desiccator is carried for removing moisture from the container interior. The desiccator may be included in a pouch that has been suitably placed within the interior by passing through the open mouth of the container, or the desiccator may be included in an internal pouch carried on the inside wall of the container having a plurality of perforations or slits so as to be in communication with the interior. The latter pouch may readily contain a closure means such as a zipper or the like whereby the desiccator may be readily changed without opening the mouth of the container by removing the closure means therefor.

The closure means is form fitting by the inclusion of a cushion material so that a proper seal is produced about the gathered material of the container mouth about the axle.

Therefore, it is among the primary objects of the present invention to provide a novel enclosure for a vehicle wheel set capable of isolating the wheel set from surrounding environment so as to reduce attack on the wheel components by adverse weather or environmental conditions.

Another object of the present invention is to provide a novel enclosure for a vehicle wheel set having a closure means for releasably sealing the entrance of the enclosure about the axle of the vehicle so as to separate the interior of the container from the surrounding environment whereby a controlled interior environment may be maintained.

Another object of the present invention is to provide a novel container for defining a controlled environment about the wheel set which includes a desiccator and means for removing expired desiccant and substituting new material therefor.

Still another object of the present invention is to provide a novel protective device for releasably coupling to a vehicle axle or about a selected wheel set whereby the wheel set's component parts are protected during the storage of the vehicle.

Still a further object of the present invention is to provide a novel protective cover for a wheel set which completely surrounds and encloses the wheel set so that a controlled environment may be produced within an enclosure and which is economical to manufacture as well as to use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is an end view of a typical trailer or motor vehicle supported on jacks or pylons and illustrating the rear wheel sets thereof encased by the protective enclosure of the present invention;

FIG. 2 is an enlarged view of the present invention installed about a selected wheel set;

FIG. 3 is a transverse cross-sectional view of the installed enclosure as taken in the direction of arrows 3—3 of FIG. 2;

FIG. 4 is an exploded view of the enclosure invention illustrating the bag-like container, closure means and desiccator pouch;

FIG. 5 is an enlarged sectional view of the closure means employed for sealing the mouth of the enclosure about an axle; and FIG. 6 is a transverse cross-sectional view of the closure means shown in FIG. 5, as taken in the direction of arrows 6—6 thereof.

DESCRIPTION OF THE PREFERRED EMBODIMENT

Referring now to FIG. 1, a vehicle is identified by numeral 10 which may take the form of a trailer, motor home, trailer home or the like. As is the usual case, such a trailer includes a supporting wheel set indicated by numeral 11 which is supported from the vehicle 10 by means of an axle 12. For storage purposes, the vehicle is illustrated as being supported on a pair of jacks or pylons 13 and 14 so that the wheel set is raised above the surface of the supporting ground. In this manner, which is conventional, the weight and, therefore, pressure of the vehicle is removed from the wheels and particularly from the tires thereof so that longer life can be expected from the wheel components. However, under normal circumstances the material of the tire as well as the axles and bearings are subject to attack by environmental conditions such as smog, rain, snow or the like. The present invention is employed in connection with a stored vehicle by enclosing the wheel set so that a controlled environment may be provided about the wheel components and the enclosure is illustrated in general by the numeral 15.

Referring now in detail to FIG. 2, it can be seen that the wheel set is supported on pylon 14 by means of the axle 12 so that the pair of tandem wheels 16 and 17 are cantilevered outwardly above and out of contact with the surface of the ground.

The protective enclosure of the present invention includes an open mouth bag 20 that comprises a circular bottom 21 and a circular, continuous sidewall 22 which may be integrally formed with the periphery of the circular bottom 21 at one of the ends of the sidewall and wherein the opposite end of the sidewall is substantially open-mouthed so as to be passed over the wheel set for installation. As illustrated in FIGS. 2 and 3, the protective enclosure provides sufficient material at the open end of the sidewall 22 so that the excess material may be gathered about the axle 12 and held in sealing relationship to the axle by means of a closure means 23. The closure means may take any form of sealing device such as a C-clamp belt clamp, a Velcro fastener, a buckle device or the like. By employing a Velcro fastener, registration of a thong with a hole in a strap such as used in a belt type fastener is avoided.

A feature of the present invention resides in the provision of a pouch 26 that preferably contains a quantity of desiccant so that the controlled environment within the interior of the enclosure 20 may be readily dehumidified or demoisturized. The pouch 26 may be insertably disposed within the interior of the container as a separate package, or, as illustrated, a perforated or slotted envelope 27 may be carried on the inside wall surface of the sidewall 22 into which the pouch 26 may be readily inserted. Access is made to the envelope via any suitable means such as a zippered entrance indicated by numeral 28. By this means, the desiccator pouch may be replaced at the convenience of the user.

Referring now to FIG. 4, it can be seen that the enclosure 20 includes a closed side portion as indicated by the numeral 21 and an open portion indicated by numeral 30 representative of the mouth leading into the interior of the container. The enclosure is bag-like and the material of the enclosure defining or adjacent the mouth 30 may be readily gathered about the axle 12 and clamped thereto by means of the closure means 23 to effect a sealing relationship therebetween. The material of the enclosure 20 may be of any suitable flexible nature such as plastic or plastic composition, which may include vinyl chloride or the like. The material is preferably strong enough to last for a number of years and the enclosure may be readily fabricated in a variety of sizes so as to accommodate more than one size tire.

Referring now to FIGS. 5 and 6, one closure means is illustrated which takes the form of a clamp, having a portion 31 and 32 releasably mounted about the square axle housing 12. Sealing or compliance of the device with the axle is achieved by means of a cushion material indicated by numeral 33. The cushion material is confined within a U-shaped channel forming the body portions of the clamp sections 31 and 32 respectively. Preferably, the clamp body portions are flexible so that the clamp may be placed about the axle 12 with the opposing ends of the section as indicated by numerals 34 and 35, adjacent each other. At this time, a locking device is operated by placing a loop 36 over a hook 37 and actuating a lever arm 38 so as to draw the loop tightly about the hook in a locking relationship. The device may be referred to as an over-center toggle mechanism and, if desired, a resilient means such as a spring or other biasing device may be employed to operate the loop 36 when the lever or handle 38 is operated. As illustrated, the gathered material of the container indicated by numeral 30 is seemingly disposed between the cushion portion of the clamp 23 and the external surface of the axle 12. With the internal envelope for pouch 26, it is not necessary to remove or unlock the closure means 23 to replace the desiccator.

Therefore, it can be seen that a novel wheel set protector is set forth herein and that the enclosure of the protector may be readily assembled and disassembled from a selected wheel set with ease and convenience. Furthermore, it can be seen that by enclosing the wheel sets, not only is the tire protected but other wheel components, such as brakes, bearings and the like, are contained within their restricted environment regardless of the external environment or ambient conditions. It is also to be understood that the device of the present invention need not be employed with a pair of wheels or a tandem wheel set but may be employed on a single wheel or may even be employed on adjacent wheel sets in the event more than one wheel set is employed. In the latter instance, the enclosure may contain four wheels or any multiples of two as desired.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a motor vehicle or trailer intended to be stored on jacks or blocks so that a selected wheel or wheel set is elevated from the supporting ground, the combination which includes a protective wheel enclosure comprising:
   an enclosure having a bottom and a continuous sidewall integrally carried at a selected edge to the edge of the sidewall from its end carried by said bottom constituting an open mouth to insertably receive said wheel set into the internal chamber of said enclosure;
   closure means for holding said sidewall opposite edge in a gathered arrangement about the axle of said wheel set so as to provide a sealing relationship between the internal chamber of said enclosure and its external environment;
   means carried by said enclosure within said internal chamber for attaining a controlled environment therein;
   said last mentioned means including a desiccant held in a confined pouch;
   said continuous sidewall including means for releasably mounting said pouch within said internal chamber; and
   access means operably carried by said sidewall permitting access to said pouch from exteriorly of said enclosure.
2. The invention as defined in claim 1 wherein
   said closure means includes a cushion material directly engageable with said wheel set axle and a locking device contractably carried about said cushion material for releasably holding said closure means about the gathered edge of said enclosure
3. A protective enclosure for a wheel of a vehicle or trailer being stored comprising:
   a bag-like container insertably receiving said wheel into an internal chamber via an opening at a selected end thereof;
   said selected end of said container having a sufficient excess material portion to permit gathering thereof about the axle;
   closure means releasably engageable with said gathered material portion to secure said container onto the axle;
   a desiccator carried within said internal chamber to control the environment thereof to the exclusion of the ambient environment;
   said container in cooperation with said closure means completely separates and encloses said wheel and its component parts from ambient conditions;
   said closure means including a clamp device having a pair of "C" sections coupled together by a loop on one section and a hook on the other section; and
   an over-center toggle mechanism operably connected to said loop for releasably securing said sections together about said gathered material.
4. The invention as defined in claim 3 wherein
   said closure means includes a cushion carried by each of said sections for conforming to the shape of said axle and said gathered material to effect sealing.

* * * * *